United States Patent
Trautenberg

(10) Patent No.: US 8,610,623 B2
(45) Date of Patent: Dec. 17, 2013

(54) RAIM ALGORITHM

(75) Inventor: Hans L. Trautenberg, Ottobrunn (DE)

(73) Assignee: Astrium GmbH, Taufkirchen (DE)

( * ) Notice: Subject to any disclaimer, the term of this patent is extended or adjusted under 35 U.S.C. 154(b) by 252 days.

(21) Appl. No.: 13/165,950

(22) Filed: Jun. 22, 2011

(65) Prior Publication Data

US 2011/0316737 A1    Dec. 29, 2011

(30) Foreign Application Priority Data

Jun. 23, 2010   (EP) ................................ 10 006 518

(51) Int. Cl.
*G01S 19/19*     (2010.01)

(52) U.S. Cl.
USPC .................................... 342/357.58

(58) Field of Classification Search
USPC .................................... 342/357.58
See application file for complete search history.

(56) References Cited

U.S. PATENT DOCUMENTS

| | | | |
|---|---|---|---|
| 7,783,425 B1 * | 8/2010 | Hwang et al. ................. | 701/511 |
| 8,131,463 B2 * | 3/2012 | Lopez et al. .................... | 701/469 |
| 8,339,312 B2 * | 12/2012 | Krueger et al. ............ | 342/357.58 |
| 2008/0062041 A1 * | 3/2008 | Lee .......................... | 342/357.02 |

FOREIGN PATENT DOCUMENTS

WO    WO 2005/088332 A2    9/2005

OTHER PUBLICATIONS

European Search Report dated Nov. 24, 2010 (seven (7) pages).
Veit Oehler et al., "User Integrity Risk Calculation at the Alert Limit Without Fixed Allocations", ION GNSS 17$^{th}$ International Technical Meeting of the Satellite Division, Sep. 21-24, 2004, pp. 1645-1652, XP002375519.
Veit Oehler et al., "The Galileo Integrity Concept", ION GNSS 17th International Technical Meeting of the Satellite Division, Sep. 21-24, 2004, pp. 604-615, XP002375520.
Veit Oehler et al., "The Galileo Integrity Concept and Performance", Galileo-Industries GmbH, ENC-GNSS Proceedings: The European Navigation Conference, Jul. 19, 2005, (eleven (11) pages), XP007910438.
Felix Kneissl et al., "Combined Integrity of GPS and Galileo", www.insidegnss.com, Jan./Feb. 2010, pp. 52-63.
"Aeronautical Telecommunications", International Standards and Recommended Practices, Annex 10 to the Convention on International Civil Aviation, vol. 1, sixth edition Jul. 2006, (three-hundered and three (303) pages).

* cited by examiner

*Primary Examiner* — Harry Liu
(74) *Attorney, Agent, or Firm* — Crowell & Moring LLP

(57) ABSTRACT

Methods and apparatus for implementing a receiver autonomous integrity monitoring (RAIM) algorithm are provided. The RAIM algorithm is for determining an integrity risk in a global navigation satellite system (GNSS) by processing several ranging signals received from satellites of the GNSS. The algorithm involves determining several integrity risks at an alert limit for different fault conditions of the ranging signals, and determining an overall integrity risk at the alert limit from the determined several integrity risks.

18 Claims, 1 Drawing Sheet

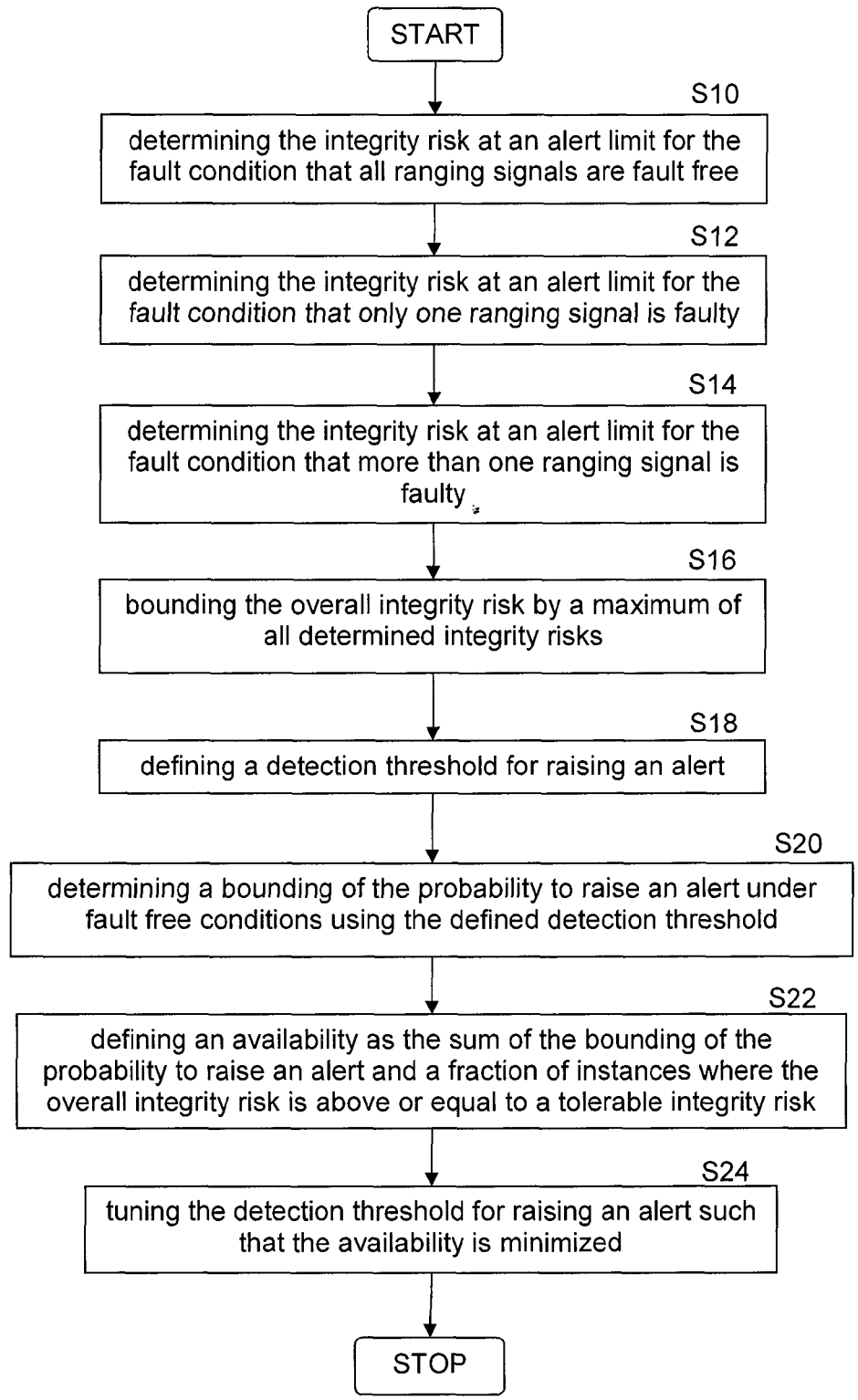

RAIM ALGORITHM

CROSS REFERENCE TO RELATED APPLICATION

The present application claims priority under 35 U.S.C. §119 to European Patent Application No. 10 006 518.4, filed Jun. 23, 2010, the entire disclosure of which afore-mentioned document is herein expressly incorporated by reference

TECHNICAL FIELD

The invention relates to a RAIM (Receiver Autonomous Integrity Monitoring) algorithm.

BACKGROUND

RAIM (Receiver Autonomous Integrity Monitoring) provides integrity monitoring of a GNSS (Global Navigation Satellite System) to GNSS receivers. RAIM algorithms process GNSS signals and are based on statistical methods, with which faulty GNSS signals can be detected. Enhanced RAIM algorithms allow not only fault detection (FD) of any received GNSS signal, but also exclusion of a GNSS signal being detected as faulty from positioning, thus allowing a continuous operation of a GNSS receiver. This is known as fault detection and exclusion (FDE).

RAIM is important for safety-critical applications such as in aviation navigation. GNSS based navigation in aviation is until now not standardized by the ICAO (International Civil Aviation Organization). However, the maximum allowable offsets, bends, and errors during precision landing of an airplane are categorized in three different categories CAT-I, CAT-II, and CAT-III, wherein CAT-III contains the smallest allowable offsets, bends, and errors.

SUMMARY OF INVENTION

Exemplary embodiments of the invention provide an improved RAIM algorithm employable in a GNSS receiver, wherein the algorithm is particularly suitable to fulfill the requirements as outlined by the by ICAO for CAT-I.

A basic idea underlying the present invention is to determine integrity risks at an alert limit. The determined integrity risks can then be transferred to a protection level concept, as employed by many RAIM algorithms. The transfer from Integrity at the alert limit to protection levels, which are commonly used in aviation, is for example described in "Combined Integrity of GPS and GALILEO", F. Kneissl, C. Stöber, University of FAF Munich, January/February 2010, http://www.insidegnss.com. With the inventive RAIM algorithm it is possible to fulfill CAT-I requirements for precision landing.

An embodiment of the invention relates to a RAIM algorithm for determining an integrity risk in a GNSS by processing several ranging signals received from satellites of the GNSS, wherein the algorithm comprises the following acts:
  determining several integrity risks at an alert limit for different fault conditions of the ranging signals, and
  determining an overall integrity risk at the alert limit from the determined several integrity risks.

The act of determining several integrity risks may comprise one or more of the following acts:
  determining the integrity risk at an alert limit for the fault condition that all ranging signals are fault free;
  determining the integrity risk at an alert limit for the fault condition that only one ranging signal is faulty.

The act of determining several integrity risks may further comprise the act of
  determining the integrity risk at an alert limit for the fault condition that more than one ranging signal is faulty.

The act of determining an overall integrity risk may comprise the act of
  determining the overall integrity risk by bounding it by a maximum of all determined integrity risks.

The act of determining an overall integrity risk may alternatively or additionally comprise the act of
  determining the overall integrity risk by it by on average over all intervals.

The algorithm may further comprise the acts of
  defining a detection threshold for raising an alert and
  determining a bounding of the probability to raise an alert under fault free conditions using the defined detection threshold,
  defining an availability as the sum of the bounding of the probability to raise an alert and a fraction of instances where the overall integrity risk is above or equal to a tolerable integrity risk, and
  tuning the detection threshold for raising an alert such that the availability is minimized.

The act of defining an availability may comprise
  selecting for a fraction of instance a set of times at a location, where the sum is maximal, or a set of times at representative locations.

According to a further embodiment of the invention, a computer program may be provided, which implements an algorithm according to the invention and as described above and enabling the determining of an integrity risk in a GNSS when executed by a computer. The computer program may be for example installed on a computing device with a receiver for ranging signals from a GNSS, for example ranging signal from NAVSTAR-GPS or the upcoming European GNSS GALILEO.

According to a further embodiment of the invention, a non-transitory record carrier storing a computer program according to the invention may be provided, for example a CD-ROM, a DVD, a memory card, a diskette, or a similar data carrier suitable to store the computer program for electronic access.

A yet further embodiment of the invention provides a receiver for ranging signals from the satellite of a GNSS, comprising
  a memory storing a computer program of the invention and as described before and
  a processor being configured by the stored computer program to process received ranging signals with the algorithm implemented by the computer program.

The receiver may be for example integrated in a mobile device such as a mobile navigation device, a smartphone, a tablet computer, or a laptop.

These and other aspects of the invention will be apparent from and elucidated with reference to the embodiments described hereinafter.

The invention will be described in more detail hereinafter with reference to exemplary embodiments. However, the invention is not limited to these exemplary embodiments.

BRIEF DESCRIPTION OF DRAWINGS

FIG. 1 shows a flowchart of an embodiment of the RAIM algorithm according to the invention.

DESCRIPTION OF EMBODIMENTS

In the following, an embodiment of the inventive RAIM algorithm is explained. The RAIM algorithm processes ranging signals received at a certain position from satellites of a GNSS. A received ranging signal is also called a measurement. Another common term for a received ranging signal is pseudorange measurement.

The RAIM algorithm processes the information contained in the received ranging signals in order to provide integrity monitoring for applications such as aviation. If the RAIM algorithm detects a faulty ranging signal, it may issue warning to a user for example a pilot by providing an alert.

For CAT-I, the ICAO has outlined several requirements for GPS, which should be fulfilled by RAIM algorithms. The requirements refer to availability, accuracy, integrity, and continuity of a GNSS based positioning service.

According to ICAO, integrity is defined as a measure of the trust that can be placed in the correctness of the information supplied by the total system. Integrity includes the ability of a system to provide timely and valid warnings to the user (alerts) when the system must not be used for the intended operation (or phase of flight).

To describe the integrity performance the following parameters are used:

Alert Limit: For a given parameter measurement, the error tolerance not to be exceeded without issuing an alert Time-to-Alert: The maximum allowable time elapsed from the onset of the navigation system being out of tolerance until the equipment enunciates the alert.

Integrity Risk: Probability that a warning is not provided within the Time-to-Alert after the Alert Limit has been exceeded.

The definitions for the terms Alert Limit and Time-to-Alert can be found on "International Standards and Recommended Practices Aeronautical Telecommunications Annex 10 to the Convention on International Civil Aviation Volume I (Radio Navigation Aids) (Amendments until amendment 84 have been considered)", Sixth Edition, July 2006. The definition for the term Integrity Risk is, for example, specified in the GALILEO system requirements.

Position Error Model

For the basic understanding of the inventive RAIM algorithm the Position Error 15 Model is explained in the following.

It is assumed that the position solution is derived by a weighted least square algorithm. It is further assumed that the linearized relation between the position-time error $\Delta x$ and the range errors $\Delta r$ given by $$\Delta x_0 = s_0 \Delta r \quad (0.1)$$

where $$S_0 = (G^T W_\xi G)^{-1} G^T W_\xi \quad (0.2)$$

where G is the design matrix and $W_\xi$ is a diagonal matrix whose n-th diagonal element is a function of the satellite range error model $\xi$ and the airborne error model assumed for the n-th satellite. N is the number of ranges in the position solution associated with $S_0$.

For GPS $\xi$=URA (User Range Accuracy) and it is $$(W_{URA})_{n,n} = \frac{1}{(URA_n)^2 + (\sigma_{n,user})^2 + (\sigma_{n,tropo})^2} \quad (0.3)$$

For GALILEO $\xi$=SISMA (Signal In Space Monitoring Accuracy) and it is $$(W_{SISMA})_{n,n} = \frac{1}{(SISMA_n)^2 + (\sigma_{n,user})^2 + (\sigma_{n,tropo})^2} \quad (0.4)$$

wherein
$\sigma_{n,user}$ accounts for multipath and user receiver noise.
$\sigma_{n,tropo}$ accounts for mismodelling of the troposphere.

The position error model for the position solution, where n-th satellite has been removed is given by $$\Delta x_n = S_n \Delta r \quad (0.5)$$

where $$S_n = (G^T M_n W_\xi G)^{-1} G^T M_n W_\xi \quad (0.6)$$

with $M_n$ being the identity matrix where the element (n,n) is set to zero.

Position Separation RAIM Algorithm

In the following, the position separation as applied by the inventive RAIM algorithm is explained.

The test statistics for the detection of a fault on satellite n is $$d_n = \Delta x_n - \Delta x_0 \quad (0.7)$$

or more precisely, as the test statistics is in every spatial direction independent, $$d_{n,i} = e_i^T (\Delta x_n - \Delta x_0) \equiv (\Delta x_n - \Delta x_0)_i \quad (0.8)$$

where $e_i$ is the unit vector in direction i. i can take the values east, north or up, or any other value depending on the selected axis.

With the definition of $\Delta S_n$ as follows $$\Delta x_n - \Delta x_0 = (S_0 - S_n) \Delta r \equiv \Delta S_n \Delta r \quad (0.9)$$

it can be written $$d_{n,i} = e_i^T \Delta S_n \Delta r \equiv \Delta S_{n,i} \Delta r \quad (0.10)$$

Detection Threshold and Alarm Probability

In the following, the detection threshold and alarm probability according to the inventive RAIM algorithm are described.

If the error distributions $p_{r,m}$ m of the individual ranges $\Delta r_m$ are paired bounded by $$q_{L,m} = \frac{K_m}{\sqrt{2\pi}\,\sigma_m} \exp\left(-\frac{1}{2}\left(\frac{\bullet + \mu_m}{\sigma_m}\right)^2\right) \text{ with } K_m \in [1, \infty) \quad (0.11)$$

$$q_{R,m} = \frac{K_m}{\sqrt{2\pi}\,\sigma_m} \exp\left(-\frac{1}{2}\left(\frac{\bullet - \mu_m}{\sigma_m}\right)^2\right) \quad (0.12)$$

$$\int_{-\infty}^{y} q_{L,m}(x)dx \geq \int_{-\infty}^{y} p_{r,m}(x)dx \text{ for } y \in (-\infty, \infty) \quad (0.13)$$

$$\int_{y}^{\infty} p_{r,m}(x)dx \geq \int_{y}^{\infty} q_{R,m}(x)dx \text{ for } y \in (-\infty, \infty) \quad (0.14)$$

the following holds true for the probability distribution $p_{d_{n,i}}$ of $d_{n,i}$ for all $L>0$ $$\int_{-\infty}^{-L} p_{d_{n,i}}(x)dx + \int_{L}^{\infty} p_{d_{n,i}}(x)dx \leq \left[\prod_{m=1}^{N} K_m\right]\left[1 - \mathrm{erf}\left[\frac{L - \mu_{\Delta S_{n,i}}}{\sqrt{2}\,\sigma_{\Delta S_{n,i}}}\right]\right] \quad (0.15)$$

with $$\mu_{\Delta S_{n,i}} = \sum_{m=1}^{N} \|(\Delta S_{n,i})_m\|_2 \mu_m \quad (0.16)$$

and $$\sigma_{\Delta S_{n,i}} = \sum_{m=1}^{N} ((\Delta S_n)_m \sigma_m)^2 \quad (0.17)$$

From (0.15) the inventive RAIM algorithm can determine that the probability $p_{fa_{n,i}}$ to raise an alert under fault free conditions if a detection threshold of $D_{n,i}$ is used is bounded by $$p_{fa_{n,i}}(D_{n,i}) = \left[\prod_{m=1}^{N} K_m\right]\left[1 - \mathrm{erf}\left[\frac{D_{n,i} - \mu_{\Delta S_{n,i}}}{\sqrt{2}\,\sigma_{\Delta S_{n,i}}}\right]\right] \quad (0.18)$$

Furthermore, the inventive RAIM algorithm can determine that the probability to raise an alert under fault free conditions is bounded by $$p_{fa} = \sum_{i=1}^{I}\sum_{n=1}^{N} p_{fa_{n,\alpha(i)}}(D_{n,\alpha(i)}) + 1 - \prod_{n=1}^{N}(p_{\mu_n} \cdot p_{\sigma_n}) \quad (0.19)$$

where $p_{\mu_n} \cdot p_{\sigma_n}$ is the probability that (0.11) to (0.14) hold true for pseudo range n under fault free conditions and I is the number of dimensions which are to be considered in the detection algorithm via alert limits. $\alpha(\cdot)$ maps the enumeration of the dimensions to the actual dimensions.

Integrity Risk

Next, the integrity risk determination according to the inventive RAIM algorithm is explained.

Only one signal is considered as faulty. Therefore one of the $\Delta_{x_{n,i}}$ is the difference between the fault free solution with N−1 signals and the (faulty or fault free solution) with N signals. The inventive RAIM algorithm can determine that the integrity risk at the alert limit ($p_{HMI}$) is therefore bounded by the maximum of the maximum of all fault free integrity risk at the (alert limit minus $d_{n,i}$) ($p_{HMI,fm}$) and the fault free integrity risk ($p_{HNI,ff}$).

$$p_{HMI} = \max(p_{HMI,ff}, p_{HMI,fm}) + p_{mf} \quad (0.20)$$

$$p_{HMI,ff} = \quad (0.21)$$

$$\left[\left(\prod_{m=1}^{N} K'_m\right)\left(\sum_{i=1}^{I}\left(1 - \mathrm{erf}\left(\frac{AL_i - \mu'_{S_{0,\alpha(i)}}}{\sqrt{2}\,\sigma'_{S_{0,\alpha(i)}}}\right)\right)\right) + 1 - \prod_{n=1}^{N}(p_{\mu'_n} \cdot p_{\sigma'_n})\right]$$

$$p_{HMI,fm,n} = \quad (0.22)$$

$$\left[\prod_{\substack{m=1\\n\ne m}}^{N} K'_m\right]\left[\sum_{i=1}^{I}\left[1 - \mathrm{erf}\left[\frac{AL_{\alpha(i)} - d_{n,\alpha(i)} - \mu'_{S_{n,\alpha(i)}}}{\sqrt{2}\,\sigma'_{S_{n,\alpha(i)}}}\right]\right]\right] +$$

$$1 - \prod_{\substack{m=1\\n\ne m}}^{N}(p_{\mu'_m} \cdot p_{\sigma'_m})$$

$$p_{HMI,fm} = \max_{n=1\ldots N}(p_{HMI,fm,n}) \quad (0.23)$$

with $$\mu'_{S_{n,i}} = \sum_{m=1}^{N} \|(S_{n,i})_m\|_2 \mu'_m \quad (0.24)$$

and $$\sigma'_{S_{n,i}} = \sum_{m=1}^{N}((S_{n,i})_m \sigma'_m)^2 \quad (0.25)$$

and $$\mu'_{S_{0,i}} = \sum_{m=1}^{N} \|(S_{0,i})_m\|_2 \mu'_m \quad (0.26)$$

and $$\sigma'_{S_{0,i}} = \sum_{m=1}^{N}((S_{0,i})_m \sigma'_m)^2 \quad (0.27)$$

The primes indicate that the overbounding might be different from the overbounding used for the computation of the alert probabilities. As the integrity risk is smaller than the alert probability, the probabilities $p_{\mu_n} \cdot p_{\sigma_n}$ most likely have to be smaller, which in turn result in possible larger $\mu_m'$, $\sigma'$ and K'.

$p_{ff}$ is the probability that all ranging signals are fault free.

$p_{fm}$ is the probability that any one and only one of the signals is faulty.

$p_{mf}$ is the probability that more than one ranging signal is faulty.

If one is not interested in bounding the integrity risk for a specific interval but on average over all intervals, a bound for the average integrity risk can be computed by the inventive RAIM algorithm with $$p_{avHMI} = p_{ff}\,p_{HMI,ff} + \sum_{n=1}^{N} p_{fm,n}\,p_{HMI,fm,n} + p_{mf} \quad (0.28)$$

The difference between (0.20) and (0.28) is that the first bounds the integrity risk for any interval whereas the second bounds the integrity risk on average over all intervals.

Tuning of the Detection Threshold

Finally, the tuning of the detection threshold according to the inventive RAIM algorithm is explained.

The detection thresholds in (0.19) have to be tuned such that the availability that is basically the sum of the false alert probability $p_{fa}$ and the fraction of instances where the integrity risk at the alert limit computed with either (0.20) or (0.28) is above or equal to the tolerable integrity risk, where the are replaced by $D_{n,i}$ for the evaluation of (0.20) respectively (0.28), is minimized. Depending on the definition of availability, different sets of instances have to be used. The set of instances can be a set of times at the location where the above sum is maximal. Or the set of instances can be sets of sets of times at representative locations. The set to be used depends on the definition of availability.

FIG. 1 shows a flowchart of the inventive RAIM algorithm. In step S10, the integrity risk $p_{HMI,ff}$ at an alert limit for the fault condition that all ranging signals are fault free is determined. In the next step S12, the integrity risk $p_{HMI,fm}$ at an alert limit for the fault condition that only one ranging signal is faulty is determined. In a following step S14, the integrity risk $p_{mf}$ at an alert limit for the fault condition that more than one ranging signal is faulty is determined.

In step S16, the overall integrity risk by a maximum of all determined integrity risks is bounded, refer to equations (0.20) and (0.28) above. In a further step S18, a detection threshold $D_{n,i}$ for raising an alert is defined.

In step S20, a bounding of the probability to raise an alert under fault free conditions using the defined detection threshold is determined, refer to equations (0.18) and (0.19) above.

In step S22, an availability as the sum of the bounding of the probability to raise an alert and a fraction of instances where the overall integrity risk is above or equal to a tolerable integrity risk is defined, as described above.

Then in step S24, the detection threshold for raising an alert is tuned such that the availability is minimized, as described above.

The present invention particularly allows a better balancing between different contributions to the integrity risk in a GNSS as well as to the false alarm probability.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for performing a receiver autonomous integrity monitoring (RAIM) algorithm for determining an integrity risk in a global navigation satellite system (GNSS) by processing several ranging signals received from satellites of the GNSS, the method comprises the following acts:
determining several integrity risks at an alert limit for different fault conditions of the ranging signals;
determining an overall integrity risk at the alert limit from the determined several integrity risks;
defining a detection threshold for raising an alert;
determining a bounding of a probability to raise an alert under fault free conditions using the defined detection threshold;
defining an availability as a sum of the bounding of the probability to raise an alert and a fraction of instances where the overall integrity risk is above or equal to a tolerable integrity risk; and
tuning the detection threshold for raising an alert such that the availability is minimized.

2. The method of claim 1, wherein the act of determining several integrity risks comprises at least one of the following acts:
determining an integrity risk at an alert limit for a fault condition that all ranging signals are fault free; and
determining an integrity risk at an alert limit for a fault condition that only one ranging signal is faulty.

3. The method of claim 1, wherein the act of determining several integrity risks comprises the act of:
determining an integrity risk at an alert limit for a fault condition that more than one ranging signal is faulty.

4. The method of claim 2, wherein the act of determining an overall integrity risk comprises the act of:
determining the overall integrity risk by bounding it by a maximum of all determined integrity risks.

5. The method of claim 2, wherein the act of determining an overall integrity risk comprises the act of:
determining the overall integrity risk by on average over all intervals.

6. The method of claim 1, wherein the act of defining the availability comprises the acts of:
selecting for a fraction of instances a set of times at a location, where the sum is maximal, or a set of times at representative locations.

7. A non-transitory record carrier storing a computer program implementing a receiver autonomous integrity monitoring (RAIM) algorithm for determining an integrity risk in a global navigation satellite system (GNSS) by processing several ranging signals received from satellites of the GNSS, when the computer program is executed by a computer the computer program:
determines several integrity risks at an alert limit for different fault conditions of the ranging signals;
determines an overall integrity risk at the alert limit from the determined several integrity risks;
defines a detection threshold for raising an alert;
determines a bounding of a probability to raise an alert under fault free conditions using the defined detection threshold;
defines an availability as a sum of the bounding of the probability to raise an alert and a fraction of instances where the overall integrity risk is above or equal to a tolerable integrity risk; and
tunes the detection threshold for raising an alert such that the availability is minimized.

8. The non-transitory record carrier storing the computer program of claim 7, wherein the determination of several integrity risks comprises at least one of:
determining an integrity risk at an alert limit for a fault condition that all ranging signals are fault free; and
determining an integrity risk at an alert limit for a fault condition that only one ranging signal is faulty.

9. The non-transitory record carrier storing the computer program of claim 7, wherein the determination of several integrity risks comprises:
determining an integrity risk at an alert limit for a fault condition that more than one ranging signal is faulty.

10. The non-transitory record carrier storing the computer program of claim 8, wherein the determination of an overall integrity risk comprises:
determining the overall integrity risk by bounding it by a maximum of all determined integrity risks.

11. The non-transitory record carrier storing the computer program of claim 8, wherein the determination of an overall integrity risk comprises:
determining the overall integrity risk by on average over all intervals.

12. The non-transitory record carrier storing the computer program of claim 7, wherein the definition of the availability comprises:
selecting for a fraction of instances a set of times at a location, where the sum is maximal, or a set of times at representative locations.

13. A receiver for ranging signals from the satellite of a global navigation satellite system (GNSS), comprising:
a non-transitory memory storing a computer program; and
a processor coupled to the non-transitory memory, wherein when the processor executes the computer program, the processor
determines several integrity risks at an alert limit for different fault conditions of the ranging signals;
determines an overall integrity risk at the alert limit from the determined several integrity risks;
defines a detection threshold for raising an alert;
determines a bounding of a probability to raise an alert under fault free conditions using the defined detection threshold;
defines an availability as a sum of the bounding of the probability to raise an alert and a fraction of instances where the overall integrity risk is above or equal to a tolerable integrity risk; and
tunes the detection threshold for raising an alert such that the availability is minimized.

14. The receiver of claim 13, wherein the determination of several integrity risks comprises at least one of:
determining an integrity risk at an alert limit for a fault condition that all ranging signals are fault free; and determining an integrity risk at an alert limit for a fault condition that only one ranging signal is faulty.

15. The receiver of claim 13, wherein the determination of several integrity risks comprises:
determining an integrity risk at an alert limit for a fault condition that more than one ranging signal is faulty.

16. The receiver of claim 14, wherein the determination of an overall integrity risk comprises:
determining the overall integrity risk by bounding it by a maximum of all determined integrity risks.

17. The receiver of claim 14, wherein the determination of an overall integrity risk comprises:
determining the overall integrity risk by on average over all intervals.

18. The receiver of claim 13, wherein the definition of the availability comprises:
selecting for a fraction of instances a set of times at a location, where the sum is maximal, or a set of times at representative locations.

* * * * *